United States Patent [19]
Tracy

[11] Patent Number: 5,941,238
[45] Date of Patent: Aug. 24, 1999

[54] HEAT STORAGE VESSELS FOR USE WITH HEAT PUMPS AND SOLAR PANELS

[75] Inventor: Lawrence M. Tracy, Belleair Beach, Fla.

[73] Assignee: Ada Tracy, Belleair Beach, Fla.

[21] Appl. No.: 09/028,402

[22] Filed: Feb. 24, 1998

Related U.S. Application Data

[60] Provisional application No. 60/039,008, Feb. 25, 1997.

[51] Int. Cl.$^6$ .......................................................... F24J 2/04
[52] U.S. Cl. .............................. 126/641; 165/48.2; 62/260
[58] Field of Search ............................. 165/45, 140, 163, 165/48.2; 237/48.2, 2 B; 62/2 B, 260; 126/641

[56] References Cited

U.S. PATENT DOCUMENTS

| | | | |
|---|---|---|---|
| 4,123,003 | 10/1978 | Winston | 237/1 A |
| 4,128,124 | 12/1978 | Worthington | 165/48 S |
| 4,143,705 | 3/1979 | Awalt, Jr. | 165/18 |
| 4,201,264 | 5/1980 | Platt | 165/162 |
| 4,211,613 | 7/1980 | Meckler | 203/11 |
| 4,256,475 | 3/1981 | Schafer | 62/2 |
| 4,296,799 | 10/1981 | Steele | 165/74 |
| 4,361,135 | 11/1982 | Metz | 126/437 |
| 4,378,908 | 4/1983 | Wood | 237/2 B |
| 4,491,172 | 1/1985 | Hitchin | 165/10 |
| 4,566,281 | 1/1986 | Sandrock et al. | 62/48 |
| 4,787,444 | 11/1988 | Countryman | 165/48.2 |
| 4,824,287 | 4/1989 | Tracy | 405/36 |
| 4,920,926 | 5/1990 | Linke et al. | 122/379 |

OTHER PUBLICATIONS

Erik H. Arctander, Coming: A Triple Threat Solar Heat Pump, Popular Science, vol. 206, No. 2, pp. 106–107. Apr. 1975.

*Primary Examiner*—James C. Yeung
*Assistant Examiner*—Donna Mann
*Attorney, Agent, or Firm*—Ware Fressola Van Der Sluys & Adolphson LLP

[57] ABSTRACT

A solar heat storage and heat pump system includes an insulated heat storage vessel filled by a liquid heat storage medium. A first heat exchanger is deeply immersed in the storage vessel, with solar panel means operatively connected by a pair of delivery and return conduits to the first heat exchanger for delivery of solar-heated liquid to the first heat exchanger, and return. A second heat exchanger is shallowly immersed in the vessel, and a heat pump is operatively connected by a pair of conduits to the second heat exchanger for pumped circulating delivery of heat storage liquid to said heat pump for use in both heating and cooling operation.

6 Claims, 3 Drawing Sheets

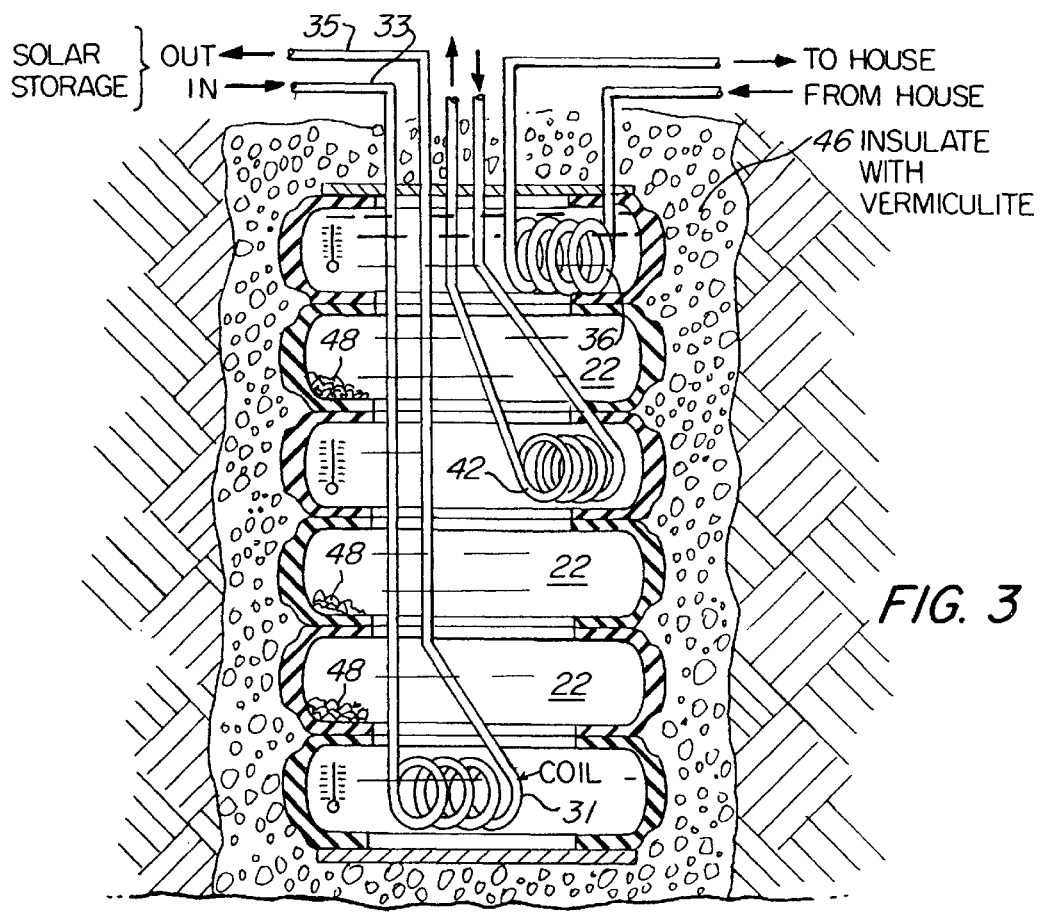
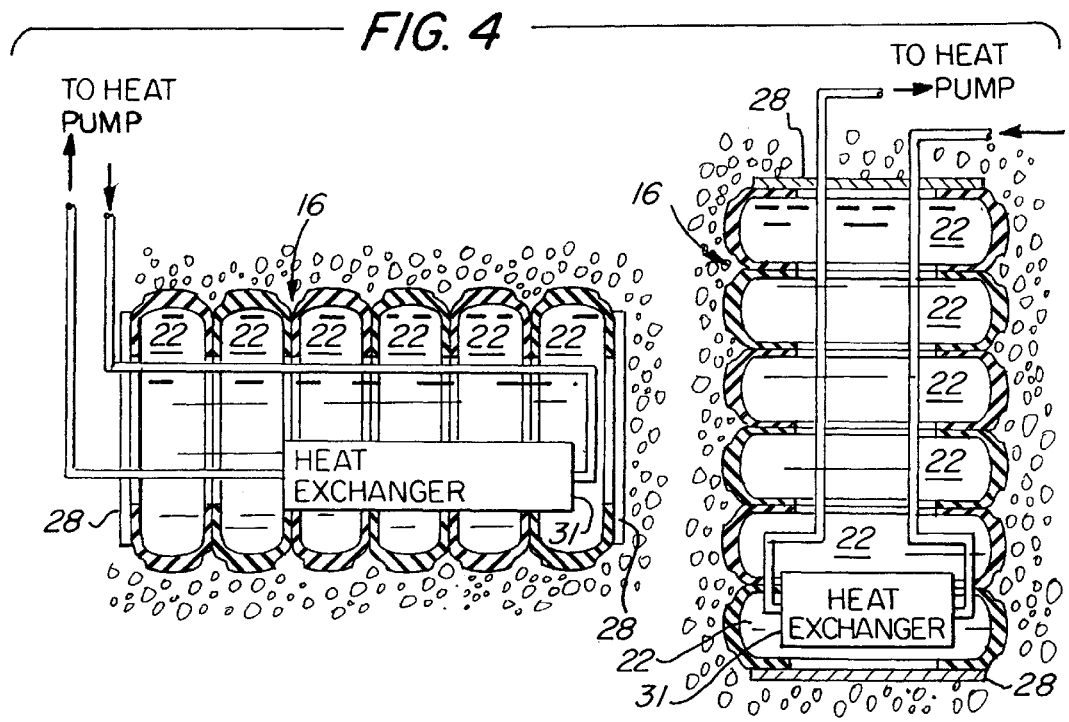

HEAT STORAGE VESSELS FOR USE WITH HEAT PUMPS AND SOLAR PANELS

CROSS-REFERENCE TO RELATED APPLICATION

This application is a non-provisional application claiming priority benefit under 35 U.S.C. 119(e) of a previously filed and co-pending provisional application Ser. No. 60/039,008 of Lawrence M. Tracy, filed Feb. 25, 1997.

FIELD OF INVENTION

This invention relates to liquid filled storage vessels for underground or above ground use, providing substantially sealed enclosures for heat transfer liquid heated by water or other fluid circulating from solar panels exposed to solar radiation, and connected to form heat storage reservoirs for delivery of stored heat to provide home heating, hot water or to promote air conditioner operation.

RELATED ART

The present inventor's U.S. Pat. No. 4,824,287 discloses stacked arrays of surplus vehicle tires with their sidewalls clipped together, provided with end plates and thus producing an enclosed underground chamber, as illustrated in FIG. 2 of that patent. That chamber was suggested for use as a septic tank, and variations of it in different orientations were disclosed for use as drainage field galleries for diffusion of the waste water into larger bodies of earth and thus into the subsoil and the surrounding ground.

SUMMARY OF THE INVENTION

Some of the same principles are applied in the chambers of the present invention to provide sealed chambers which can be used as heat reservoirs with heat pump and solar heating systems, to contain significant large volumes of water or ethylene glycol or other liquids, which are heated by solar energy received in solar panels and delivered by circulating fluid systems connected to heat exchange delivery coils positioned at the lower end of these chambers. Heat exchange withdrawal coils positioned at higher levels in the chambers are connected by suitable fluid conduits to heat pumps, hot water supply tanks, hot water baseboard radiators, and the like in a nearby home or a similar building.

Thus a principal object of the invention is to provide inexpensive sealed tank vessels for permanent storage of heat exchange liquids either above ground or in colder climates installed underground adjacent to homes, offices, or other living space to be heated or cooled.

Other objects of the invention will in part be obvious and will in part appear hereinafter.

THE DRAWINGS

For a fuller understanding of the nature and objects of the invention, reference should be made to the following detailed description taken in connection with the accompanying drawings, in which:

FIGS. 2 and 3 are similar enlarged fragmentary schematic diagrams showing the underground tank in cross section with heat exchange coils installed at different levels.

Figure 5:
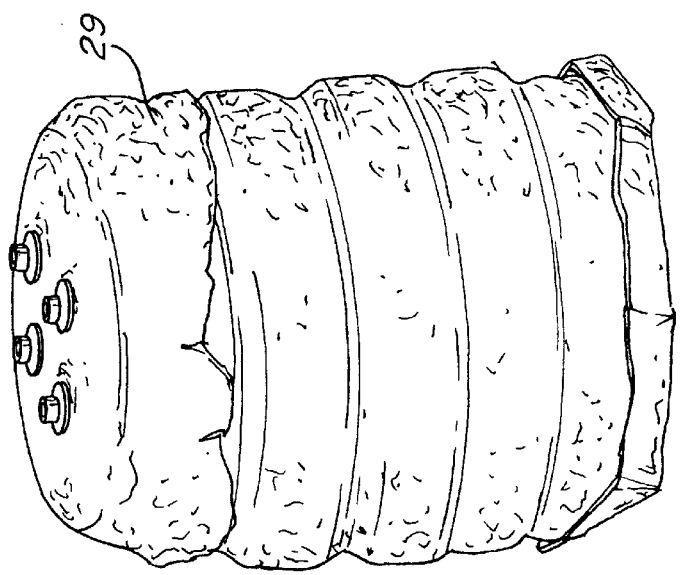

FIG. 4 shows similar underground tire array vessels with heat exchangers positioned therein shown oriented in both horizontal and vertical array positions and FIG. 5 is a perspective view showing the exterior of a storage tank employing the principles of the present invention enclosed in a spray-on foamed-in-place jacket, with suitable plumbing pipe connections shown at the upper end of the vessel, ready for underground installation and backfill.

BEST MODE FOR CARRYING OUT THE INVENTION

Figure 2:
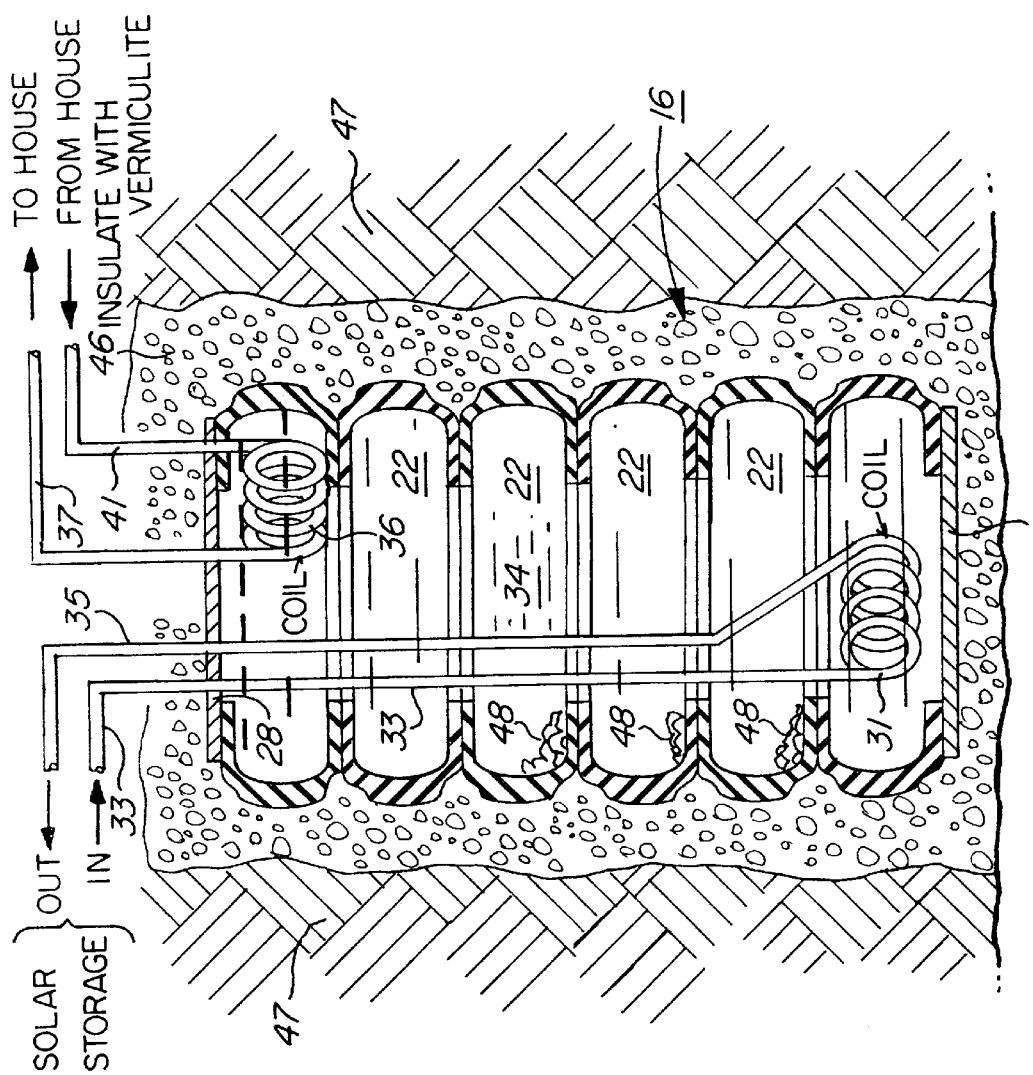

The liquid reservoir storage tanks 16 are similar to the tank 16 shown in FIG. 2 of my U.S. Pat. No. 4,824,287, in that they are formed by a column of stacked used vehicle tires 22, with both ends of the stack being closed by metal plates 28 to complete the enclosure formed by tank 16 and provide a substantially leakproof liquid reservoir for underground storage of a heat exchange liquid. The stack of tires 22 and the end plates 28 may be joined together by metal fastenings or by resilient elastomer seals or adhesives.

Alternatively, as indicated in FIG. 5, the tank 16 may be enclosed in a foamed-in-place jacket of polystyrene or other polymer foam, forming a substantially unitary and leakproof tank for underground use. Foam jacket 29 has an additional advantage in providing insulation tending to maintain the temperature of the liquid contents in the tank 16 constant, and to avoid the loss of heat from the tank. The heat storage medium to be contained in the tank 16 is preferably a liquid, and both water and ethylene glycol have been used for this purpose with maximum effect.

HEAT EXCHANGE COILS

Various heat exchangers are indicated as coils of tubing in the various drawings, immersed in the fluid contents of tank 16 and connected by suitable conduits to external heat handling units such as solar panels, heat pumps, or hot water heaters. Shown in the lower portion of tank 16 in FIGS. 1, 2, 3 and 4 are heat delivery heat exchangers 31, positioned to introduce hot liquid circulating from such heating means as the solar panel 32 shown in FIG. 1.

The radiation from the sun, heating panel 32, heats the circulating liquid traveling through the panel in contact with the solar receptors and is then delivered by conduit 33 to coil 31 at the bottom of the tank 16.

Convection currents in the liquid 34 enclosed in tank 16 are caused to flow vertically upward by the heat introduced from coil 31, and the warm liquid directly above coil 31 tends to rise toward the top of tank 16, displacing cooler liquid from the upper end of tank 16 for downward flow in normal convection return currents around the periphery of the tank.

Figure 1:
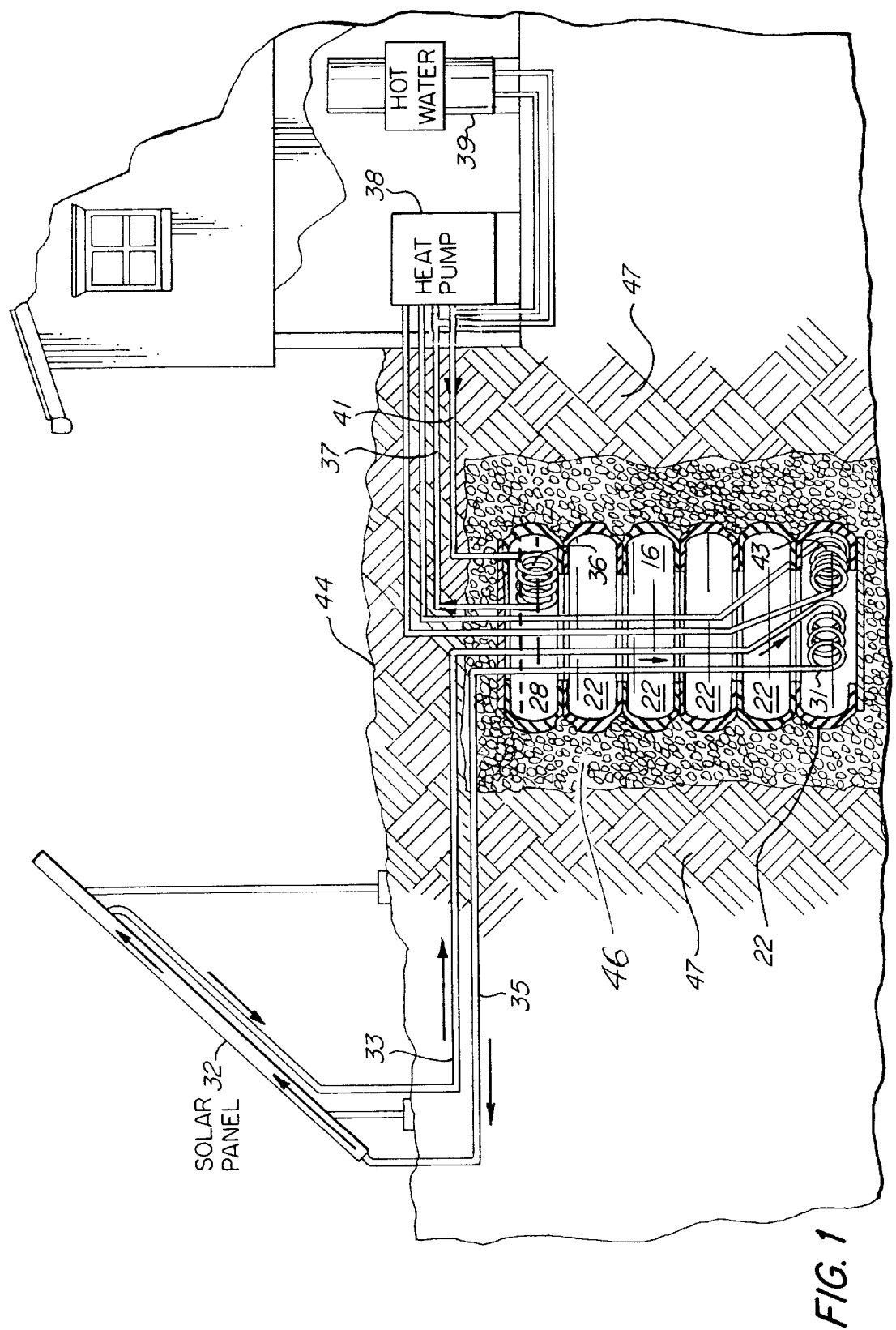
FIG. 1 is a schematic elevational diagram showing an underground tank formed of surplus vehicle tires, and employed in a system of the present invention with a solar panel installation, and a heat pump and hot water tank in the adjacent building.

An extraction heat exchanger 36 positioned near the top of tank 16 is also shown in FIGS. 1 through 3, and is connected by a heat extraction conduit 37 to such heat receiving units as the heat pump 38 or the hot water tank 39 shown in FIG. 1. The return conduit 41 is provided for return flow of the heat exchange fluid from these units back to the extraction heat exchanger 36.

In addition to heat exchangers 31 and 36, an additional heat exchanger 42 connected to a moderate heat source such as heat pump 38 by suitable conduits or to other sources may be positioned in tank 16 at an intermediate level, as shown in FIG. 3. If a hot heat exchanger 43 connected to a different source of greater heat such as heat pump 38 is employed, it may be positioned at the bottom of tank 16 as shown in FIG. 1 close to the hot heat exchanger 31 from solar panel 32.

When tank 16 is buried below the ground surface 44 as indicated in FIGS. 1–3, it may be enclosed in a substantial coating of vermiculite for heat insulation before earth backfill 47 is positioned around the tank 16. Foam jacket 29 performs the same function as vermiculite for heat insulation, isolating tank 16 from the surrounding earth, and when foam jacket 29 is employed the vermiculite coating may be eliminated if desired. In temperate climates where very cold weather is not expected, the tank 16 particularly in its foam jacketed mode of FIG. 5 may be positioned above ground and connected to the other components of the system shown in the underground installation in FIG. 1, solar heat panels 32, heat pump 38, and hot water tank 39.

If desired, other heat storage materials may be included in the liquid filled tank 16, such as chopped used tires or other recycled materials such as broken glass, plastic and the like, which can usefully be placed on the peripheral shelves 48 (FIG. 2), but the normal convection currents rising and descending in the fluid enclosed in tank 16 should not be unduly impeded by the incorporation of such additional filler materials.

The geothermal underground cisterns of this invention comprise heat storage containment vessels 16 made of discarded tires 22, have indefinite lifespans, and provide environmentally valuable uses for waste tires. These containment vessels assist and supplement conventional heat pumps 38, enabling them to run at peak efficiency for less operating time, supplying pre-heated liquid or pre-cooled liquid, minimizing cost of oil, gas or electricity for air conditioning or heating of living space or hot water. Particularly in desert climates with hot days and cool nights, as in Arizona and New Mexico, daytime solar heating of the containment vessel, while the heat pump 38 draws cold temperatures for air conditioning, leaves the vessel 16 filled with hot liquid suitable for providing heat and hot water, during the evening, thereby leaving the vessel 16 filled with cool liquid for air conditioning the following day.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A solar heat storage system comprising in combination:

an externally-insulated heat storage vessel containing and substantially filled by a liquid heat storage medium, a first heat exchanger deeply immersed in said storage vessel, solar panel means, having an upper end and a lower end, operatively connected by a pair of delivery and return conduits to said first heat exchanger for delivery of solar-heated liquid from the upper end of said solar panel means to said deeply immersed first heat exchanger, and return of the liquid to the lower end of said panel means, a second heat exchanger shallowly immersed in said vessel, and a heat pump operatively connected by a pair of conduits to said second shallowly immersed heat exchanger for pumped circulating delivery of heat storage liquid to said heat pump for use in both heating and cooling operation, the heat storage vessel being surrounded externally by a heat-insulating layer, and formed by a plurality of discarded imperforate and liquid-impervious vehicle tires of substantially the same size adjacently arrayed parallel to each other with their adjacent beads firmly anchored together, and with the outermost tire at each end of the arrayed plurality of tires having its exposed bead substantially sealed by a metal plate clamped thereto, whereby the heat storage vessel is formed as an externally-insulated, substantially sealed, leak-proof container for the liquid heat storage medium.

2. The combination defined in claim 1 wherein the heat storage vessel is surrounded by an insulating layer of vermiculite.

3. The combination defined in claim 1 wherein the heat storage vessel is surrounded by an insulating layer of polymer foam.

4. The combination defined in claim 1 wherein the heat storage vessel is buried underground.

5. The combination defined in claim 1 wherein at least one additional heat exchanger is immersed in the heat storage vessel.

6. The combination defined in claim 5 wherein each heat exchanger is immersed at a different level in said heat storage vessel.

\* \* \* \* \*

UNITED STATES PATENT AND TRADEMARK OFFICE
CERTIFICATE OF CORRECTION

PATENT NO. : 5,941,238 Page 1 of 1
DATED : August 24, 1999
INVENTOR(S) : Lawrence M. Tracy It is certified that error appears in the above-identified patent and that said Letters Patent is hereby corrected as shown below:

Column 3,
Line 3, after "vermiculite", -- 46 -- should be inserted.

Signed and Sealed this

Twenty-eighth Day of May, 2002

Attest:

JAMES E. ROGAN
Attesting Officer    Director of the United States Patent and Trademark Office